United States Patent [19]

Billieres

[11] Patent Number: 5,962,778

[45] Date of Patent: Oct. 5, 1999

[54] DEVICE FOR MONITORING STRESSES UNDERGONE BY A TIRE

[75] Inventor: Jean Billieres, Clermont-Ferrand, France

[73] Assignee: Compagnie Generale des Etablissements Michelin—Michelin & Cie, Clermont-Ferrand Cedex, France

[21] Appl. No.: 09/120,790

[22] Filed: Jul. 22, 1998

[30] Foreign Application Priority Data

Jul. 23, 1997 [FR] France ................................. 97 09453

[51] Int. Cl.⁶ .................................................. G01M 17/02
[52] U.S. Cl. ................................ 73/146; 73/849; 73/851; 152/154.2
[58] Field of Search .......................... 73/146, 849, 851; 152/154.2

[56] References Cited

U.S. PATENT DOCUMENTS

| | | |
|---|---|---|
| 4,144,921 | 3/1979 | Yabuta et al. ........................ 152/154.2 |
| 4,318,436 | 3/1982 | Shurman . |
| 4,409,841 | 10/1983 | Archer . |
| 5,303,756 | 4/1994 | Hill . |

*Primary Examiner*—Joseph L. Felber
*Attorney, Agent, or Firm*—Baker & Botts, L.L.P.

[57] ABSTRACT

A tire which, during use is subjected to one or more severe stresses leading to an appreciable reduction of its potential lifetime of use under nominal conditions. In order to be able to determine whether a tire has undergone such severe conditions, the tire is provided with a monitoring device, containing at least one means sensitive to a given stress and capable of memorizing a piece of information, according to the stress to which the component has been subjected for at least a given time or a given number of cycles.

13 Claims, 2 Drawing Sheets

DEVICE FOR MONITORING STRESSES UNDERGONE BY A TIRE

BACKGROUND OF INVENTION

The invention concerns a device for monitoring the level of stress borne by a tire during its use on a vehicle and, in particular, a device making it possible to determine whether or not a tire has rolled under severe stress conditions, leading to an appreciable reduction of its potential lifetime, such as, for example, rolling at a pressure well below the recommended inflation pressure and even at zero pressure. The invention also concerns a tire equipped with at least one such device during or after its manufacture.

Tires undergo intense stresses during use; stresses mean those resulting from the load borne and also stresses resulting from the deformation cycles, which are defined by an amplitude and by a total number of cycles (each passage of a section of the tire into the zone of contact corresponds to one cycle).

An ordinary tire is formed by beads intended to be in contact with the seats of a mounting rim, by a reinforcing belt surmounted by a tread intended to come in contact with the ground during rolling, and by sides (i.e. sidwalls) ensuring the connection between said beads and said belt. On each passage into the zone of contact with the ground, the part of the tread affected by contact with the ground transmits the load borne by the tire to the ground and the sides ensure the transmission of said stresses between the rim and the tread. Under the action of those contact stresses, the sides are locally deformed, that is, the part of the sides attached to the part of the tread affected by contact undergoes more or less pronounced bending, depending on the load supported.

What is meant by bending is that the sides adopt profiles, seen in meridional section (that is, perpendicular to the equatorial plane of the tire), whose smallest radii of curvature diminish from entry of the region of contact to the midportion of the latter.

By increasing the inflation pressure of the tire, the stiffness of the sides is increased, and the bending strain of the latter is then reduced for the same load supported.

To balance the stresses due to inflation pressure and limit the resulting deformation, the elastomer sides are reinforced by a carcass containing at least one fabric composed of a plurality of reinforcements in the form of wires or cords oriented in a direction forming an angle at least equal to 45 degrees with the circumferential direction; these reinforcements support a tensile stress component resulting from inflation of the tire. The carcass supports the same deformation as the side on each cycle; it is therefore subjected mainly to the same bending cycles on each passage into the zone of contact. Furthermore, depending on the position of said carcass in the thickness of the side, this carcass is subjected, in that bending stress, to repeated variations of forces whose amplitude is directly linked to the bending imparted to said carcass.

At the end of rolling of a tire, that is, for example, when the tread reaches a degree of wear requiring said tire to be retreaded or renewed with a new tread, or else when a tire, deflated, for example, as a result of damage, has to be repaired, it is very important, for the user's safety, to check the state of the tire and, among other things, the state of damage to the carcass. Determining the state of the tire entails a quantitative evaluation of the possible reduction of its endurance potential resulting from the rolling conditions, knowing that in the initial state the potential of the new tire is at a maximum and a limit is set beyond which the tire is no longer usable, for it no longer has an endurance potential sufficient for the user.

In the case of passenger vehicles, it is very common to observe tires inflated to a pressure well below working pressure (that is, the recommended pressure for which the endurance performance potential of said tire is optimal under recommended conditions of use); in such a configuration, relatively brief use can be without consequence, while prolonged or repeated use can result in an appreciable reduction of endurance potential and, therefore, of lifetime by comparison with what can be reasonably expected under the nominal conditions recommended. However, this situation does not prevent the driver of the vehicle from sometimes riding for many miles.

Unfortunately, very often the damage to the tire resulting from that abnormal use for a more or less long cumulative time is not visibly detectable, even by means of a careful examination of the inside or outside of the tire.

Furthermore, in a large number of uses on trucks, for example, and in order to be able to support very considerable loads, it is common to employ what is called a dual tire mount. A dual mount denotes mounting of two pairs of identical tires on the same axle, said tires being inflated to the same working pressure in normal use.

With this type of mounting, it is quite common for one of the two tires to be partially if not totally deflated, while the other tire retains all of its inflation pressure. However, that situation does not prevent the driver of the vehicle from riding for many miles without realizing it, unless he is equipped with a deflation warning system.

In such a situation, the tire partially or totally deflated presents a reduced rigidity by comparison with the rigidity of the other inflated tire forming the pair; consequently, the inflated tire supports almost by itself the entire load usually carried by both tires forming the pair, while the deflated tire carries only a portion of the load, and less as its internal pressure drops in relation to that of the other tire.

Consequently, the inflated and deflated tires forming the same pair undergo additional squashing, that is, their sides are subjected to severe bending cycles capable of causing fatigue damage, for example, in the reinforcing structures of said tires.

Therefore, in contrast to the inflated tire, whose carcass always remains subject to tension in spite of the greater bending, the carcass of the deflated tire is not under tension in practice and can even be compressed locally for very intense bending (corresponding to very small radii of curvature in relation to the radii of curvature taken by the same structure under the conditions recommended). This alternate weak tensile stress followed possibly by compression in the carcass can, if the number of cycles is sufficient, result in progressive damage to said structure, rendering the tire unusable. One refers to fatigue damage to the carcass by analogy with what happens on repeatedly bending a metal rod, for example.

In case of rolling under heavy loads and/or low pressures, the sides (i.e. sidewalls) of the tires, constituting a pair in a dual mount, can touch each other, at least locally, on each passage in contact, which also produces a reduction of the resistance and endurance characteristics of the sides in contact after a given rolling time.

To detect a tire having undergone rolling in such conditions, the outside and inside of the tire can be visually inspected to detect possible signs thereof. Experience has shown that it is very difficult to obtain reliable results with this method, even for an expert, with a tire used on a passenger car, truck or other vehicle.

In order to obtain information on the state of damage to a tire, complex devices and equipment have been developed, employing radiography or radioscopy means or a laser to detect directly in the structure constituting said tire possible signs of damage to said tire resulting from particular rolling conditions. However, those means, aside from not always being available on the tire repair site, are usually difficult to use, for example, once the damage to the tire involves its carcass and is inside the structure of said carcass. A long observation time is, moreover, necessary for making a thorough and detailed inspection.

Furthermore, a facility of this type is relatively expensive and requires considerable know-how to use it.

As a general rule, when there is doubt, the tire being examined is inflated in a protection cage to a pressure higher than working pressure (at least 1.25 times), so as to cause the intentional bursting of said tire, in case its reinforcing structures have undergone considerable but not outwardly visible fatigue. However, there are cases in which a tire does not burst in the inflation test, even though its reinforcing structure is damaged and renders said tire unusable on a vehicle.

SUMMARY OF THE INVENTION

The objective of the invention is to propose a simple inexpensive device, permanently memorizing and displaying, after rolling of a tire, the fact that at least one component of said tire has undergone excessive stress, by comparison with the usual stresses of said component when said tire is used under the conditions recommended, and for which it has been dimensioned, in terms of both amplitude of stresses and number of stress cycles. Stress means a mechanical stress, a chemical stress, a thermal stress or even a combination of at least two of those stresses.

According to the invention, a device monitoring the state of damage to at least one component of a tire is proposed, said tire possibly having undergone at least one predetermined stress for at least part of the time of use of said tire on a vehicle. Said device is characterized in that it is intended to be placed on or in a tire in proximity to said component before rolling, and in that it contains at least one means sensitive to the predetermined stress, so as to be able to memorize at least one permanent piece of information, according to which part has undergone said stress for at least a number of given cycles or else for a given time.

By component is meant, for example, either a reinforcing structure or a part of the rubber compound tire.

A device according to the invention offers the advantage of supplying reliable information during and after rolling, depending on whether or not a tire equipped with such a device has undergone very severe rolling conditions on the level of tire endurance.

More specifically, a monitoring device is used in combination with a tire to monitor the state of damage to a reinforcing structure of a rolling tire on a vehicle and to memorize rolling conditions with an inflated tire having an inner wall and an outer wall, the inflation pressure of the tire being exerted on the inner wall and said monitored structure being at least locally subjected to at least one cyclically variable mechanical stress.

The device monitoring damage to said markedly bent structure is characterized in that it contains a very flexible thin support, one face of which is designed to be fixed to one of the walls of the tire and in proximity to the structure being monitored and in that said support contains means sensitive to intense bending and permanently memorizing at least one piece of information, depending on the monitored structure that has undergone intense bending for at least a given number of cycles, which permanently memorized information can be checked visually by an operator or else automatically, with or without dismounting of the tire.

One advantage of the device according to the invention is to supply information on possible excessive deterioration of the initial mechanical and chemical characteristics of the rubber compounds forming one of the walls of the tire; said deterioration can consist of accelerated ageing of the compound, resulting, for example, from a combination of effects due to temperature, the presence of air in proximity to said wall and mechanical stresses.

Another advantage of the device according to the invention is that it can be placed on a new tire during or after manufacture of said tire or even after a repair, retreading (renewal of the tread after wear) or any other operation on said tire.

DESCRIPTION OF THE DRAWINGS

The invention just explained will be better understood by means of the following figures, concerning variant embodiments presented solely by way of example.

DESCRIPTION OF PREFERRED EMBODIMENTS

Figure 1:
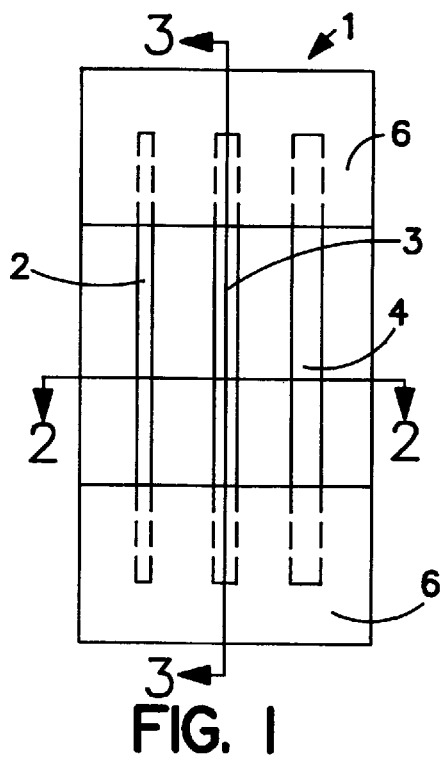
FIG. 1 shows a device according to the invention containing three wires sensitive to repeated intense bending stresses.

A monitoring device 1 according to the invention is represented in FIG. 1, in which said device contains means 2, 3, 4 sensitive to intense bending and capable of memorizing the fact that said device has been subjected to repeated bending cycles between a first radius of curvature Rmax and a second radius of curvature Rmin, at least one of said two radii of curvature being less than or equal to the fatigue limit radius of one of the sensitive means.

Fatigue limit radius means that, if that same means is subjected to bending cycles between two radii of curvature, both being greater than that fatigue limit radius, then said means is not subject to irreversible and visible damage. Depending on the value of the two extreme radii of curvature, one obtains a fatigue limit of the sensitive means which is a function both of the value of said minimum and maximum radii of curvature and the number of cycles to which said means is subjected.

The appreciably rectangular device 1 represented in FIG. 1 is formed by a thin layer (thickness: 0.6 mm) of rubber constituting the support 5 of the device; on that support 5 three wires 2, 3, 4 are so placed that they are oriented in the same direction parallel to the wide side of the rectangle formed by the supports. The wires are chosen among wires (capable of being formed by one or more wires assembled together) characterized by being sensitive to a cyclic bending stress; glass wires formed by one or more strands can, for example, be used.

The wires 2, 3, 4 of circular cross section with different diameters present different fatigue characteristics, which makes it possible to obtain precise information on the rolling conditions of the tire provided with said device. In fact, the wire of greatest diameter has a fatigue limit which is reached before the other wires of lesser diameters reach their proper limits.

Figure 3:
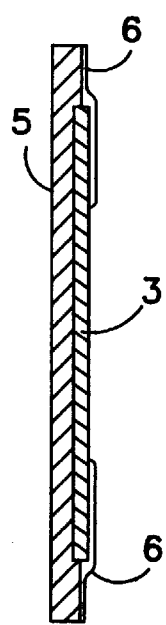
FIG. 3 shows a section along 3—3 of FIG. 1 along one wire.
Figure 4:
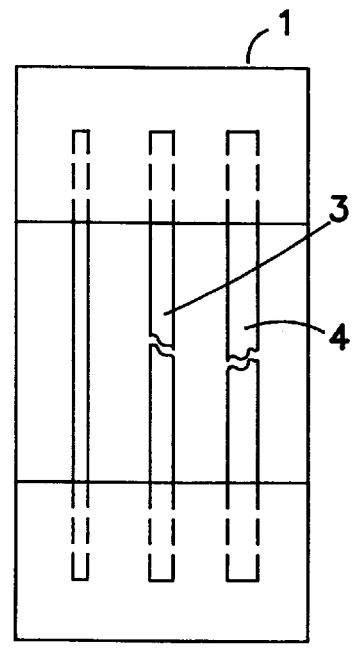
FIG. 4 shows the device of FIG. 1 after use on a tire having undergone rolling conditions under weak pressure for a relatively long time.

The ends of wires 2, 3, 4 are coated with a fine layer of rubber 6 to ensure the fixing of said wires on the support (as can be seen in section represented in FIG. 3) and to make possible a direct reading of the information memorized, as can be easily verified in FIG. 4, which represents the same device 1 having undergone a number of bending cycles sufficient to break the two wires of greatest diameter, but insufficient to break the third.

A variant embodiment consists of using at least one wire on a support, without using any coating of the ends of said element or elements, for example, by arranging to coat each wire with a binding agent ensuring adhesion with the support. The monitoring device is preferably placed on the inner wall of the tire, in order not to risk coming off in the course of rolling.

The layer serving as support for the wires is in the present case made of a rubber compound 0.6 mm thick; that layer could, of course, be made in any other material and thickness with satisfactory qualities of resistance to repeated bendings.

After placement of the wires on one of the surfaces of said support, the ends of the wires are coated with another layer of rubber compound of the same nature as the support and the assembly is then subjected to vulcanization under pressure.

In addition, it can be arranged to indicate, by means of a mark visible on the surface of the device bearing the wire or wires, a direction parallel to the direction of the wire or wires, said direction being perpendicular to the direction around which bending should take place, so that the latter can possibly be detected by at least one wire (in the present case, the direction marked by two arrows is perpendicular to wires 2, 3, 4).

Figure 2:
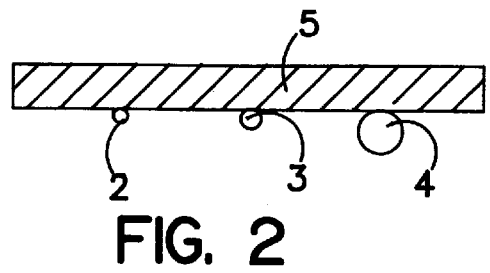
FIG. 2 shows a section along 2—2 of FIG. 1 crosswise to the wires.

FIG. 2 shows a section of the device 1 of FIG. 1, said section being made along a transverse plane perpendicular to the three wires 2, 3, 4 placed parallel to each other. Said three wires 2, 3, 4, slightly projecting on one of the surfaces of the support 5, are of the same nature, but have circular cross sections of different diameters, the fragility of each wire being proportional to its diameter.

The device of FIG. 4 corresponds to the device shown in FIG. 1 after use on a tire having rolled for at least a number of miles on a vehicle. Said device reveals a bending stress sufficient to have caused rupture damage by compression fatigue on two of the three wires.

The presence of those ruptures is a sign of probable rolling under conditions different from those recommended; this finding entails taking the tire out of service for normal use or at least the need for a further examination of the reinforcing structures by other means.

In use on a tire, a rupture of the three wires would have indicated that the tire had probably undergone even harsher rolling conditions, having entailed very considerable wear of the carcass.

In the present case, reading of the information memorized by the device is done directly, but it is possible to resort to radioscopy or radiography means making it possible to obtain said information without having to demount the tire.

In addition to the device just described, it is possible to make another device provided with only one wire, and even none.

In the latter case, that is, with no wire, a support is chosen whose component material is sensitive to a given stress, for example, a cyclic bending stress, for a given minimum time and/or a given number of cycles. By sensitive material is meant that said material shows apparent changes in at least one of its characteristics (for example, appearance of marks, cracks, change of color, etc.).

This sensitivity to bending fatigue stress can be introduced and regulated appropriately by using diene rubber-base compounds, such as natural rubber, synthetic rubber of the polybutadiene family or styrene-butadiene copolymers, or even blends of those different types of rubber. This sensitivity can also be secured with butyl-base formulations chosen for their weak fatigue strength in the case of an elevated compressive stress resulting from abnormal use of the tire.

In order to obtain better stability of the device on a tire, it is preferable to incorporate said device, formed by at least one sensitive material, during the manufacture of said tire, and to vulcanize the tire and the device together. Such arrangement further has the advantage of avoiding any possibility of tampering and, consequently, of attaining greater reliability.

Another variant consists of forming a device made up of several compounds, each of the compounds being sensitive to a given stress for a given time or number of cycles; thus, it is possible to obtain precise information on the stresses undergone by the tire during its use.

Another embodiment of a device according to the invention consists of incorporating at least one wire in the tire during the manufacture of said tire, each wire being placed roughly in the direction of a structure subject to monitoring, in a manner visible to the naked eye or by supplementary means, for example, by radioscopy.

Figure 5:
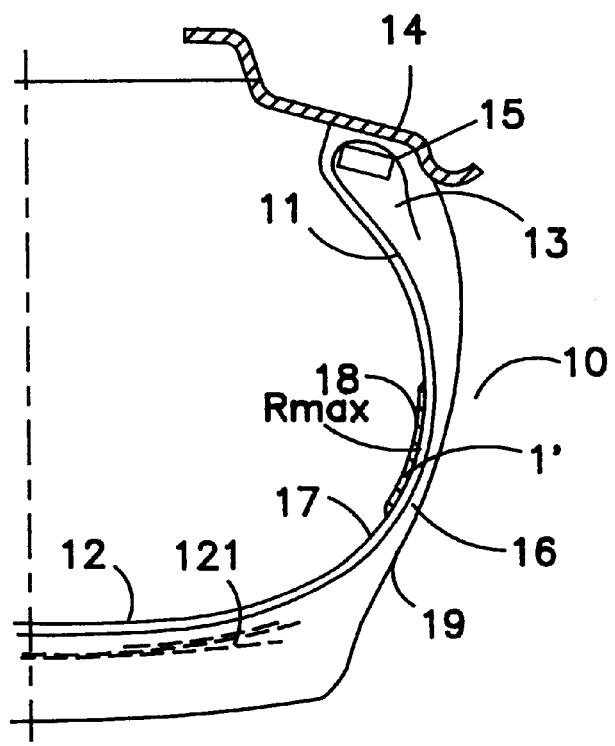
FIG. 5 shows a section of a tire provided on its inner surface and in the sidewall region with a device according to the invention formed by a slight thickness of a rubber compound sensitive to repeated intense bendings.
Figure 6:
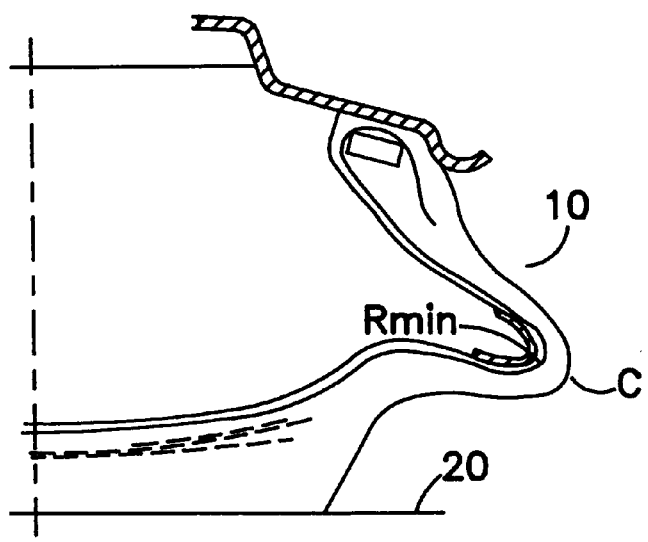
FIG. 6 shows a section of the tire of FIG. 5 under rolling conditions imparting to the sides of the tire very intense bending on each passage in contact.

FIGS. 5 and 6 deal with one particular example of use of a device according to the invention, making it possible to detect an excessive bending stress in the region of the sides of a truck tire, which, if that stress continues long enough, can lead to fatigue damage to the carcass.

The tire 10 whose meridional half-section is shown in FIG. 5 contains a carcass 11 extending between the crown 12 of said tire and beads 13 in contact with a mounting rim 14, the carcass 11 being turned around a hub formed by an anchor bead reinforcement 15 for said carcass. The crown is reinforced by a structure 121 made up of a plurality of plies. The carcass 11 is a reinforcing structure with a plurality of reinforcements arranged in a direction forming an angle at least equal to 45° with the circumferential direction. The region between a bead 13 and the crown 12 corresponds to the sidewall 16 of the tire. In the part of said sidewall 16 near the crown region and on its inner wall (that is, on the wall on which the inflation pressure of the tire is exerted), a device 18, designed to indicate that said tire has rolled at least for a set time under conditions of excessive bending, is permanently fixed after vulcanization of the tire (but it could have been fixed during manufacture of the tire before vulcanization). Said means is merged here with the actual support of the device 18 and consists of a rubber compound ordinarily used to come in contact with the reinforcement of the carcass.

In FIG. 6, the meridional half-section partially shows the tire of FIG. 5 in the geometry assumed by the latter in passage of contact with the ground 20, when said tire forming a pair of a dual mount is inflated to a pressure well below its pressure of use. One finds that there is a markedly bent region of the tire, identified by C, in which the carcass passes a minimum bending radius, Rmin, which can significantly penalize the endurance of the carcass after a relatively small number of cycles.

Everything happens as if each reinforcement of the carcass was undergoing a bending stress on each turn of the wheel between a first radius Rmax and a second radius Rmin, the Rmax radius being almost equal to the radius measured on a meridional section of the tire inflated and represented in FIG. 5. This bending stress can, in certain rolling conditions, even be accentuated by the fact that a pair of tires mounted side-by-side come into contact locally, such as in the case in which the inflated tire supports all the load and the other tire having no pressure is subjected to a greater number of cycles of variation of curvature and one of the side walls contacts the side wall of the other tire, in which case the carcass reinforcement cords may become curved negatively increasing the fatigue of the reinforcement cords.

Tests were conducted with devices having supports of 120 mm by 40 mm or 80 mm by 10 mm and 0.6 mm or 0.3 mm thick, made of a natural rubber compound base material, the essential characteristic of which is to have a quantifiable fatigue limit for a bending cycle between a maximum radius and a minimum radius of curvature (that is precisely the device used in tests and corresponding to FIGS. 5 and 6).

After rolling under the excessive bending conditions represented in FIG. 6, it was observed that the material constituting the support 5 visibly showed cracks locally, roughly aligned with the circumferential direction of the tire. On continuing the test, it was observed that those cracks tended to spread over the entire width of the support 5. At the same time, rolling tests under the conditions recommended were conducted on identical tires equipped under the same or similar monitoring device conditions: said tests showed the good stability of said devices and the absence of cracks on the edges of said devices.

The device according to the invention can be rectangular, round or of any other shape, as required; furthermore, when it is elongated (rectangular, for example), it may be wise to place it on a wall of a tire, so that the edges are not parallel, for example, to the reinforcements of the carcass, in order to avoid a concentration of stresses at said edges. To avoid any risk of separation of the device, it may be sensible to arrange for its edges not to be straight, but, for example, indented.

The device can, according to the invention, advantageously contain a coating which is progressively obliterated under the action of friction resulting from contact of two parts of the tire under excessive bending conditions; it is sensible to choose a coating which, between the initial state and the final state after rolling, presents different colors, making possible an estimate of the number of severe cycles supported by said tire.

Up to now, interest has been focused on rollings which has subjected the carcass to excessive mechanical bending stress; but it may be necessary also to follow the rolling temperature conditions, particularly in certain regions of the tire, said conditions usually leading to a chemical change of the materials constituting the tire which, combined with normal stresses, can then lead to premature and/or excessive fatigue of said materials.

For the purpose of following the chemical changes of one or more rubber compounds comprising the tire and, in particular, what is called the ageing of said compounds, it is possible to use a device according to the invention having the appearance of a rectangular patch, for example, whose ageing characteristics are well known and which, when those characteristics are combined with the usual stresses of a rolling tire, lead to visible deterioration of the device.

It is possible to use to advantage a heat-sensitive base product designed to change color after a local or general heating exceeding a predetermined reference value (too much bending; friction between two parts of a tire than can produce local heating or simply lead to a local separation of paint from the device). The choice of paint is made according to the reference value, which in turn is chosen according to the size of the tire and the operating conditions of said tire. In this example, it is advantageous to coat the entire inner surface of the tire after its vulcanization; in fact, after rolling, a visual inspection of the interior of said tire is sufficient to ascertain the presence of zones having changed color, denoting the fact that said zones have reached a surface temperature exceeding the reference temperature. In addition, the information is completed by the precise location of such hot points.

Devices according to the invention can also be used to detect and memorize a total or almost total flattening of a tire singly mounted on an axle without even having experienced rolling under those conditions; in such case, it is necessary to use at least one crown-shaped device and to place it on at least one side, said device being equipped with a means that is particularly fragile and not withstanding overly intense bending.

One variant of a device according to the invention consists of placing a band of a compound sensitive to a certain stress level for a given time or a given number of cycles, said band forming a spiral over at least one complete turn of the tire. That arrangement, which is of value in manufacture, makes it possible to measure possible damage over a portion of a side in the meridional direction.

Another variant device according to the invention consists of spraying on the interior surface of a tire to be monitored a product chosen to adhere to said surface and for its sensitivity to at least one stress for a given time or number of cycles.

The different devices described can, of course, be advantageously combined on the same tire. It is thus possible to use a plurality of devices of the same structure or of different structures in order to follow the severe mechanical stresses on the reinforcing structures, among others, and the effect of the environment modifying the characteristics and performances of the compounds constituting the tire.

A device according to the invention can, of course, be used for the same purpose with a tire necessitating the use of an inner tube; in such a case, said device is placed on one of the walls of the tire in a manner similar to what has just been described. A device according to the invention can likewise be placed on the outer wall of the inner tube to serve also as stress indicator of said tube.

A device according to the invention represents a kind of follow-up record of use of the tire, on which are entered the uses considered particularly severe on said tire; such device is virtually tamperproof (its absence can imply that the stresses were particularly harsh and constraining) and thus contributes to increased safety for the user of tires equipped with such a device.

The use of a device according to the invention makes it possible to reduce the time and cost of inspection of a tire equipped with said device and, because of its simplicity of interpretation, it is possible to examine all tires after rolling through direct visual inspection by an operator or even automatically.

It is possible to establish a better estimate of the potential remaining lifetime, which results in the better use of tires and an optimized cost of use of tires (a particularly sensitive parameter in the field of use of tires for trucks, construction equipment and airplanes).

I claim:

1. A device for monitoring the extent of damage to a reinforcing structure of a rolling tire on a vehicle, said tire containing an inner wall and an outer wall, the inflation pressure of the tire being exerted on the inner wall and said monitored structure being at least locally subjected to at least one cyclically variable mechanical stress, said device for monitoring damage to said structure comprising a flexible thin support, one face of which is designed to be fixed to one of the walls of the tire and in proximity to the structure being monitored, and means on the support, said means being sensitive to intense fatigue bending between a radius of curvature of minimum value and a radius of curvature of maximum value for a predetermined number of cycles and capable of permanently memorizing and indicating information relating to the extent of damage of the monitored structure that has undergone intense bending for at least a given number of cycles, which permanently memorized information can be checked visually by an operator or even automatically, with or without dismounting of the tire.

2. A monitoring device according to claim 1, characterized in that it contains at least two means sensitive to intense bending, said means being calibrated differently so that each can permanently memorize a piece of information, depending on the reinforcing structure being monitored which has undergone a given bending stress, between a radius of curvature of minimum value Rmin and a radius of curvature of maximum value Rmax, for a predetermined number of cycles, so as to furnish a precise indication as to the stress actually sustained by the rolling tire under intense bending conditions.

3. A monitoring device according to claim 1, characterized in that the support is fixed on the inner wall of a side of a tire and in that the support is made of at least one rubber material, selected from the diene rubber family, sensitive to fatigue stress on very intense bending.

4. A monitoring device according to claim 1, characterized in that the support is fixed on the inner wall of a side of a tire and includes at least one element in the form of a wire oriented in a direction that can be marked on said support, said element being sensitive to and capable of permanently memorizing an intense cyclic bending stress manifesting visible damage after a predetermined minimum number of cycles.

5. A monitoring device according to claim 1, characterized in that each piece of information memorized by said device can be read by a radioscopy or radiography means.

6. A tire intended to be mounted on a vehicle characterized in that it is provided, on all or part of at least one of its walls, with at least one device for monitoring the extent of damage to at least one component of said tire, resulting from a predetermined stress that can occur during the rolling of said tire, said device being equipped with at least one means sensitive to fatigue bending between a radius of curvature of minimum value and a radius of curvature of maximum value for a predetermined number of cycles and capable of permanently memorizing and indicating information characteristic of the extent of said stress after a given number of cycles or after a given minimum time.

7. A tire according to claim 6, characterized in that at least one device monitoring the damage to a reinforcing structure of said tire includes of at least one wire sensitive to intense cyclic bending stresses, said wire being incorporated in a tire during the process of manufacture of said tire and placed generally in the direction of the reinforcemet of the structure being monitored.

8. A tire according to claim 6, characterized in that it further contains a means sensitive to the temperature resulting from the rolling conditions of said tire, said means being designed so that its physical characteristics permanently evolve in accordance with time and temperature and in a predetermined manner.

9. A tire having two beads intended to come in contact with a mounting rim, a crown provided with crown reinforcement and two side walls, each extending between one lateral end of the crown reinforcement and one bead, each side wall containing at least one carcass reinforcing structure with a plurality of reinforcements arranged in a direction forming an angle at least equal to 45 degrees with the circumferential direction and each side wall having an outer wall and an inner wall on the tire, the inflation pressure of said tire being exerted on the inner wall, and said tire being characterized in that it is equipped on one of the walls of the tire with at least one device monitoring damage to the carcass reinforcing structure, said device comprising at least one means sensitive to fatigue bending between a radius of curvature of minimum value and a radius of curvature of maximum value for a predetermined number of cycles and capable of permanently memorizing and displaying information characteristic of a predetermined amount of stress sustained by said structure for at least a predetermined rolling time.

10. A tire according to claim 9 characterized in that at least one of the monitoring devices makes it possible to assess the damage to a radial carcass containing a fabric composed of a plurality of reinforcements arranged in a direction forming an angle at least equal to 45 degrees with the circumferential direction of the tire, when the latter is repeatedly subjected to intense bendings, said device containing a support composed of at least one rubber material distinguished by having mechanical characteristics changing under the effect of said stress and then imparting to said support a fragility to common stresses, so that, under the action of said stresses, said support shows visible damage after a predetermined minimum number of cycles.

11. A tire according to claim 9, characterized in that at least one of the monitoring devices makes it possible to assess the damage to a reinforcing structure of the tire, when the latter is repeatedly subjected to very intense bendings, said device including a rubber support, and of at least one wire sensitive to a cyclic bending stress between a maximum radius Rmax and a minimum radius Rmin, said wire being placed on or in the support, and said support, once in place on one of the walls of the tire and in the location chosen, being oriented to make the wire undergo the same bendings as the said structure being monitored.

12. A monitoring device for providing an indication of the extent of damage to which a region of a tire has been subjected by repeated stress, said monitoring device comprising a bendable support intended to be applied to a wall of the tire at said region and bendable means mounted on the support to provide an indication of the extent of the damage, the material of said bendable, indicating means being designed to break after repeated, extensive bendings so that its breakage provides the indication of the extent of the damage to the region of the tire.

13. A monitoring device as set forth in claim 12 in which there are a plurality of bendable, indicating means mounted on the support, the said means being selected to break successively so as to indicate different extents of damage.

* * * * *